(12) United States Patent
Mazet et al.

(10) Patent No.: US 9,637,228 B2
(45) Date of Patent: May 2, 2017

(54) ROTOR INCLUDING A LEAD/LAG ABUTMENT MECHANISM, AND AN AIRCRAFT

(71) Applicant: AIRBUS HELICOPTERS, Marignane (FR)

(72) Inventors: Stephane Mazet, Rognac (FR); Sandra Bencardino, Marignane (FR)

(73) Assignee: AIRBUS HELICOPTERS, Marignane (FR)

( * ) Notice: Subject to any disclaimer, the term of this patent is extended or adjusted under 35 U.S.C. 154(b) by 39 days.

(21) Appl. No.: 14/682,338

(22) Filed: Apr. 9, 2015

(65) Prior Publication Data
US 2015/0307188 A1 Oct. 29, 2015

(30) Foreign Application Priority Data

Apr. 24, 2014 (FR) ...................................... 14 00961

(51) Int. Cl.
*B64C 27/32* (2006.01)
*B64C 27/51* (2006.01)
*B64C 27/54* (2006.01)

(52) U.S. Cl.
CPC ............ *B64C 27/54* (2013.01); *B64C 27/322* (2013.01); *B64C 27/51* (2013.01)

(58) Field of Classification Search
CPC ........ B64C 27/322; B64C 27/54; B64C 27/51
See application file for complete search history.

(56) References Cited

U.S. PATENT DOCUMENTS

| | | | |
|---|---|---|---|
| 3,106,965 A | 10/1963 | Gorndt et al. | |
| 3,932,059 A * | 1/1976 | Rybicki | B64C 27/322 416/140 |
| 4,203,708 A | 5/1980 | Rybicki | |
| 4,235,570 A | 11/1980 | Ferris et al. | |
| 4,297,079 A | 10/1981 | Marshall | |
| 4,361,415 A * | 11/1982 | Aubry | B64C 27/51 416/134 A |
| 4,551,067 A | 11/1985 | Caramaschi et al. | |
| 4,652,211 A * | 3/1987 | Castelli | B64C 27/322 416/107 |
| 4,915,585 A | 4/1990 | Guimbal | |
| 5,266,005 A | 11/1993 | Aubry | |
| 5,951,251 A * | 9/1999 | Mondet | B64C 27/322 416/107 |
| 8,919,692 B2 * | 12/2014 | Halcom | B64C 27/50 244/17.11 |

FOREIGN PATENT DOCUMENTS

| | | |
|---|---|---|
| EP | 0340095 | 11/1989 |
| EP | 0478444 | 4/1992 |

OTHER PUBLICATIONS

French Search Report for FR 1400961, Completed by the French Patent Office on Dec. 10, 2014, 6 Pages.

* cited by examiner

*Primary Examiner* — Christopher Verdier
*Assistant Examiner* — Brian O Peters
(74) *Attorney, Agent, or Firm* — Brooks Kushman P.C.

(57) ABSTRACT

A rotor having a hub and a plurality of lift assemblies, the rotor having one lead/lag abutment mechanism per lift assembly. Each abutment mechanism includes an elastomer spacer strip and two C-shaped metal clips engaged respectively on a first base and on a second base of the strip. Two fastener pins each pass through a clip and the longitudinal projections of a base and through an orifice in the hub.

20 Claims, 3 Drawing Sheets

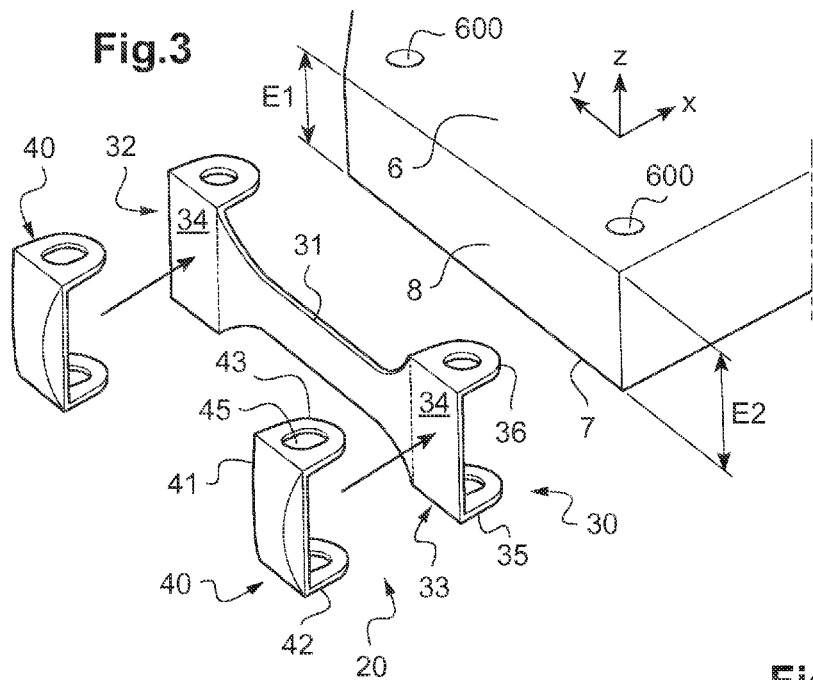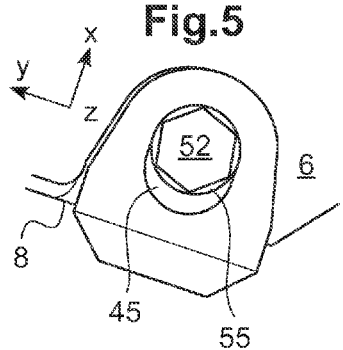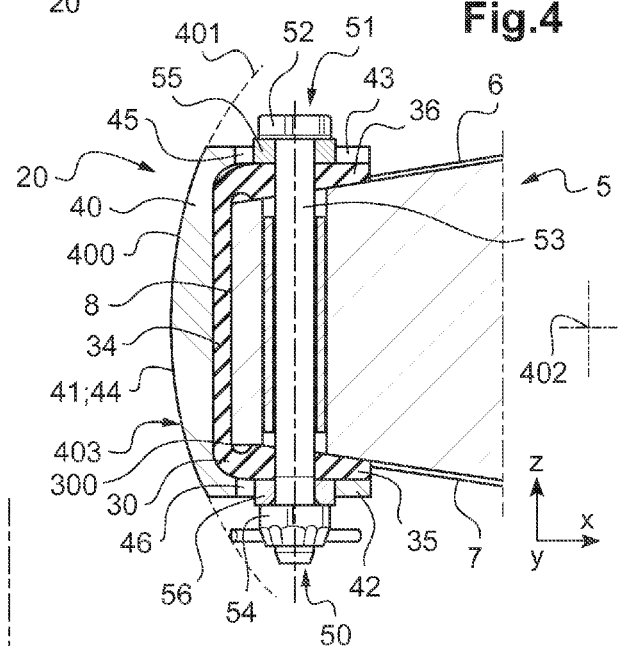

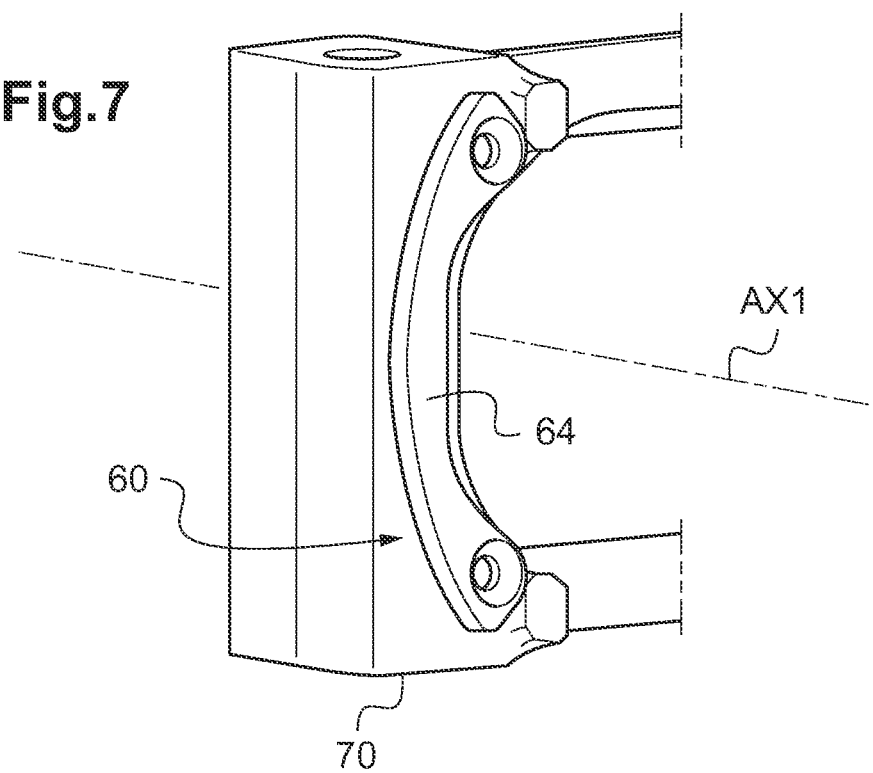

ROTOR INCLUDING A LEAD/LAG ABUTMENT MECHANISM, AND AN AIRCRAFT

CROSS REFERENCE TO RELATED APPLICATION

This application claims priority to French patent application No. FR 14 00961 filed on Apr. 24, 2014, the disclosure of which is incorporated in its entirety by reference herein.

BACKGROUND OF THE INVENTION (1) Field of the Invention

The present invention relates to a rotor including a lead/lag abutment mechanism, and to an aircraft having such a rotor.

The invention thus lies in the technical field of rotorcraft rotors. More specifically, the invention lies in the field of abutments fitted to such a rotor to limit the lead/lag movement of the lift assemblies carried by the hub of the rotor.

(2) Description of Related Art

A rotorcraft usually has at least one rotor for providing the rotorcraft with at least part of its lift and possibly also with propulsion.

A rotor comprises a hub that is set into rotation by a mast. The hub then carries at least two lift assemblies. Consequently, each lift assembly is provided with a blade that is connected to the hub via at least one retention and mobility member. Each blade may in particular comprise a lift element fastened to a cuff or indeed a lift element having an incorporated cuff.

By way of example, a retention and mobility member includes a hinge referred to as a "spherical abutment". Each spherical abutment may have one strength member fastened to the hub and another strength member fastened to a cuff, regardless of whether the cuff is or is not incorporated in a lift element.

The blades are thus substantially plane elongate elements that are carried by the hub. The blades are mounted on the hub by individual members for mounting the blades on the hub, which members include the retention and mobility members connecting the lift assemblies to the hub.

A hub may be a hub having two plates secured to a mast. By way of example, one of the strength members of a retention and mobility member is fastened to the two plates by a pin.

In another embodiment, the hub may comprise a single plate fastened to the mast, the plate being provided with radial arms including openings. A retention and mobility member is optionally positioned in each opening, being secured to the plate by one of its strength members. A cuff then extends on either side of the plate from the retention and mobility member to a lift element.

The mounting members are fitted respectively to each of the blades at their root ends in order to enable the blades to be maneuvered by an operator. By way of example, the ability of the blades to move relative to the hub makes it possible for a pilot of the rotorcraft in flight to cause the pitch of the blades to vary collectively or cyclically in order to influence the behavior of the rotorcraft in terms of its lift and/or its propulsion.

The freedom of the blades to move relative to the hub allows them to move with lead/lag movement, pitch movement, and flapping movement.

In order to control pitch, the cuff may also include a horn hinged to a pitch lever that is connected to a control device for controlling the pitch of the blade. Operating the control device causes the pitch lever to move in translation, which movement in translation serves to modify the pitch of the blade.

Under such conditions, the lead/lag movement of the blade can lead to an impact between the hub and the cuff of a blade, and in particular against its pitch lever.

Furthermore, certain rotors are fitted with inter-blade lead/lag adapters, each extending between two adjacent blades. For such rotors, the collective lead/lag mode is nevertheless not damped by the lead/lag adapters. Under such circumstances, a manufacturer may seek to protect the hub against the impacts that occur as a result of collective lead/lag movement of the lift assemblies, in particular during stages of starting and stopping the rotor, relating respectively to stages of acceleration and deceleration.

Document EP 0 340 095 describes a hub having bulges presenting lead/lag abutment surfaces facing abutment surfaces of the blades. The lead/lag abutment surfaces are slightly rounded with double curvature.

Also known are "sacrificial" metal abutments arranged on the arms of hubs carrying blades. Two metal abutments per blade are arranged on the hub to serve as abutments in the event of lead/lag movement of the blade in two opposite turning directions.

Each metal abutment is in the form of a clip fastened to the end of the arm so as to face a cuff.

Instead of impacting against the hub as a result of a lead/lag movement, a lift assembly can come into abutment against a lead/lag abutment.

Nevertheless, such a metal abutment can be difficult to put into place on a hub made of composite materials. A hub made of composite materials may present dimensional dispersions in manufacture relative to a theoretical definition. Under such circumstances, the real shape of a hub made of composite materials may make it difficult to arrange a metal lead/lag abutment that is dimensioned on the basis of the theoretical shape of the hub.

Furthermore, the end of the arm may be complex in shape, e.g. it may be a truncated cone. A metal abutment may be difficult to adapt to such a complex shape, with installation being even more difficult when there are dimensional dispersions due to fabrication of the hub.

Furthermore, the impact of a lift assembly against a metal abutment leads to a local force peak that runs the risk of locally delaminating a hub that is made of composite materials.

Documents U.S. Pat. Nos. 4,235,570 and 4,203,708 describe helicopter rotors, each having blades hinged to a hub via a retention and mobility member of the spherical abutment type.

Furthermore, each blade is connected to an arm of the hub by an actuator for limiting the lead/lag movement of a blade. Such movement is restricted to an angular range extending between a first position in which the actuator is fully retracted and a second position in which the actuator is fully extended.

Document U.S. Pat. No. 4,551,067 describes a rotor having retractable lead/lag abutments.

Document U.S. Pat. No. 4,297,079 does not lie in the technical field of rotorcraft rotors. Document U.S. Pat. No. 4,297,079 describes a marine propeller.

Also known are Documents U.S. Pat. No. 3,106,965 and EP 0 478 444.

BRIEF SUMMARY OF THE INVENTION

An object of the present invention is thus to provide an alternative rotor having an abutment mechanism for limiting the lead/lag movement of a lift assembly, in particular for a rotor having a hub made of composite materials.

According to the invention, a rotor, in particular a rotorcraft rotor, is provided with a hub and a plurality of lift assemblies, each lift assembly having a retention and mobility member connected to an arm of the hub in order to hinge the lift assembly to the hub, e.g. about three directions in rotation. The rotor has one abutment mechanism per lift assembly in order to protect the hub in the event of lead/lag movement of the lift assembly, said arm having an end provided with a top face and a bottom face that are connected together by an edge face facing a lift assembly.

Each abutment mechanism of a lift assembly comprises:

an elastomer spacer strip having a central section extending transversely from a first base to a second base along said edge face, each base having a central segment secured to the central section, the central segment being arranged against said edge face and extending in elevation from a bottom longitudinal projection arranged against the bottom face to a top longitudinal projection arranged against the top face, so as to present a C-shape;

two C-shaped metal clips engaged respectively on the first base and on the second base; and two fastener pins, each fastener pin passing through a clip and the two longitudinal projections of a respective base and a respective orifice of said arm extending in elevation from the bottom face to the top face.

The rotor is thus provided with an abutment mechanism made up of a metal portion having two clips and an elastomer portion having a single spacer strip.

Under such circumstances, the elastomer strip is engaged on the end of an arm of a hub. Such an elastomer spacer strip makes it possible to obtain shapes that can be difficult to make using a metal clip.

Since the spacer strip is made of elastomer, it presents flexibility making it easy to put into place, and enabling it to be fitted to a hub made of composite materials even if it presents dimensional dispersion due to fabrication compared with the theoretical definition of the hub.

A single type of abutment mechanism can then be suitable for arranging on multiple hubs.

This ease of adaptation can also provide greater dimensional margins in the fabrication of hubs.

Such a spacer strip may in particular be arranged on an arm presenting an end in the form of two truncated cones.

The spacer strip may be H-shaped or rectangular in shape in face view, i.e. looking along a radius of the rotor. In contrast, the spacer strip presents a C-shape in side view, i.e. looking along a tangential direction relative to the rotor.

The abutment mechanism also has two metal clips engaged on the spacer strip.

The mechanism is then fastened to the hub by fastener pins, each fastener pin possibly constituting clamping means serving in particular to clamp the longitudinal projections of the spacer strip against the top face and the bottom face of an arm.

Furthermore, such fastening is reversible, thus making it possible, where necessary, to change at least one clip or indeed the spacer strip of the abutment mechanism.

Following an extreme lead/lag movement in a first direction, the lift assembly comes into abutment against a first clip. Following an extreme lead/lag movement in a second direction, the lift assembly comes into abutment against a second clip.

During such an impact, the elastomer strip serves to damp the impact and to spread out the force exerted by the impacted clip over a large area of the edge face, i.e. the area of the base that is covered by the impacted clip. This characteristic tends to avoid generating a local force peak and serves to limit any risk of the hub made of composite materials delaminating, for example.

Under such circumstances, the abutment blade may serve to limit risks of a hub delaminating in the event of a lift assembly coming into abutment against the clip. Furthermore, the elastomer strip can accommodate dimensional dispersions in fabrication.

The abutment mechanism is then a mechanism that is relatively simple, and as a result it can possibly be inexpensive.

The rotor may also include one or more of the following additional characteristics.

In particular, the hub may be made of made of composite materials.

The hub may for example be made up of a multitude of layers of fabric such as carbon fabrics that have been compressed while hot with a resin.

In a hub fabrication mold, it is possible to make only openings that are large, which openings correspond to the recesses used for arranging the retention and mobility members. In order to pass certain pins, small holes can be made by "conventional" machining.

For example, each fastener pin comprises a bolt having a head and a nut, the mechanism having two washers per fastener pin arranged respectively between a head of the fastener pin and a longitudinal projection of a base, and between a nut of the fastener pin and the other longitudinal projection of that base, each washer being arranged in an oblong hole of a clip enabling the clip to move towards the hub in the event of an impact.

In order to contribute to damping and in order to keep the clips on the hub, the fastener pin has two washers serving to compress the elastomer strip. These washers are thus placed under the head and under the nut.

Each clip then has oblong holes in which the washers can slide. Consequently, following an impact against a lift assembly, a clip can move a little relative to the hub. This movement serves to damp the impact against the clip by flattening the elastomer strip between the clip and the edge face of an arm of the hub.

In addition, these machined holes of oblong shape in the clips reduce any risk of the fastener pins being sheared as a result of an impact against a clip.

Furthermore, said end may present two distinct profiles at the locations of the first base and of the second base of a spacer strip. The first and second bases are then different, while both clips are identical.

Because of the possibly frustoconical shape of the end of an arm and because of the eccentricity of the pitch axis of the lift assembly, hub thicknesses at the locations of the two clips of a single mechanism may be different.

This difference is compensated by using a spacer strip having bases that are different. Under such circumstances, both clips can be identical, thereby simplifying the abutment mechanism and reducing the cost of machining it.

Furthermore, the elastomer spacer strip is naturally keyed against being inserted the wrong way round ("détrompé" in French Language), thereby making it easier to install on the end of an arm of a hub.

Furthermore, at least one longitudinal projection may taper, said longitudinal projection tapering in a longitudinal direction going away from said central segment towards an axis of rotation of the hub.

This characteristic makes it easier to arrange on an arm of conical shape.

Furthermore, at least one clip may be engaged by force on a base of said spacer strip.

The clip is then mounted on a strip while compressing the elastomer of the spacer strip a little so as to avoid the presence of any clearance.

Furthermore, at least one clip may have a central portion arranged against the central segment of a base of said spacer strip, the clip having two branches secured to the central portion that are arranged against the longitudinal projections of the base, the central portion including a bulge facing the lift assembly, the bulge having the shape of a cylindrical portion of a cylinder having its axis of symmetry substantially parallel to the edge face of an arm so that an impact against a lift assembly takes place along a generator line of the cylinder regardless of the flapping angle of the lift assembly.

In particular, the axis of symmetry may optionally coincide with the flapping axis of a lift assembly.

This characteristic seeks to obtain a maximum lead/lag angle that is substantially constant regardless of the flapping angle of the lift assembly.

Furthermore, the abutment mechanism may include at least one additional abutment surface reversibly fastened on a lift assembly so as to come into abutment against a clip starting from a threshold lead/lag angle.

The abutment surface then constitutes a sacrificial part of a lift assembly and it is suitable for being replaced.

Said an abutment surface may optionally be made of metal.

Furthermore, the abutment surface may include a protuberance facing a clip, said protuberance being in the form of a cylindrical portion of a cylinder.

The additional abutment surface may also be in the form of a circular arc centered on a pitch axis of the lift assembly.

This characteristic seeks to enable contact with a clip independently of the pitch angle of the lift assembly.

Furthermore, when a lift assembly includes a horn hinged to a pitch lever, the horn may carry at least one abutment surface. For example, the horn may have two abutment surfaces each co-operating with a respective one of the clips as a result of a lead/lag movement in one or other of two opposite directions.

In addition to a rotor, the invention provides an aircraft of the above-described type, in particular a rotorcraft.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 3 is a fragmentary exploded view of the mechanism;

FIG. 4 is a section of the mechanism;

FIG. 5 is a plan view of a clip;

FIG. 6 is a diagram showing an abutment surface; and

FIG. 7 is a diagram showing an alternative abutment surface.

DETAILED DESCRIPTION OF THE INVENTION

Elements present in more than one of the figures are given the same references in each of them.

Three mutually orthogonal directions X, Y, and Z can be seen in some of the figures.

The first direction X is said to be "longitudinal". The second direction Y is said to be "transverse". Finally, the third direction Z is said to be "in elevation".

Figure 1:
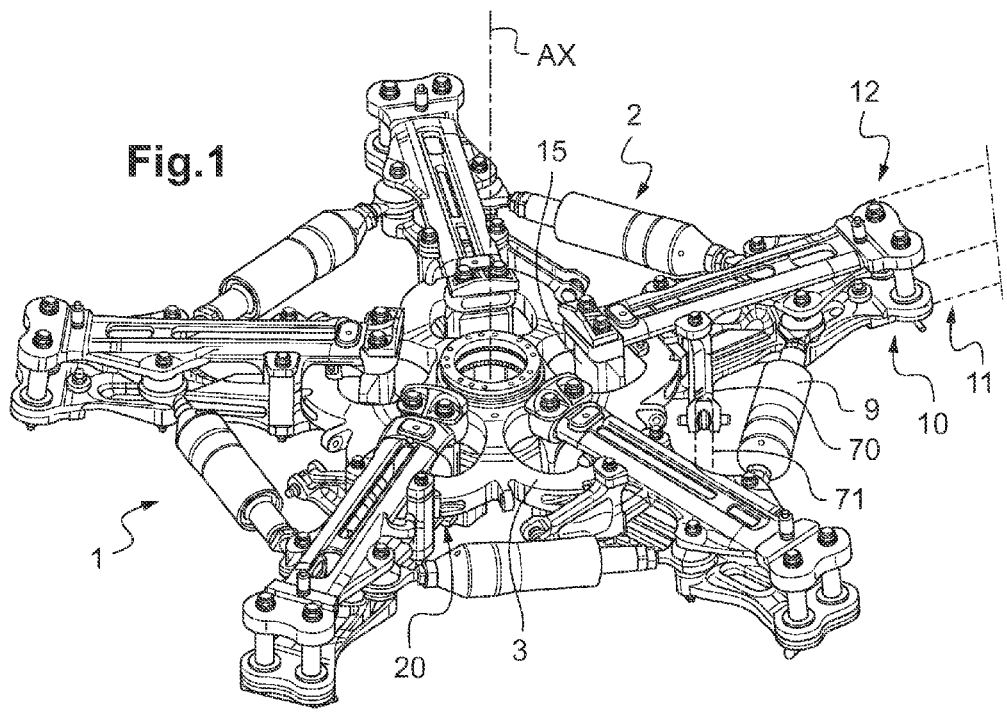
FIG. 1 is a view of an aircraft rotor of the invention.

FIG. 1 shows a rotor 2 of an aircraft 1, e.g. a rotor for providing a rotorcraft at least with lift.

The rotor 2 is provided with a hub carrying a plurality of lift assemblies 10.

Each lift assembly is provided with a blade comprising a lift element 11 and a cuff 12. FIG. 1 shows a lift element pinned to the cuff 12. Nevertheless, the cuff 12 could be an integral part of the blade.

Furthermore, the lift assembly has a retention and mobility member 15 hinging the lift assembly to the hub 3. For example, a retention and mobility member may comprise a laminated member, better known as a "laminated elastomer spherical abutment" or more simply a "spherical abutment".

Consequently, the hub has one arm per lift assembly, the retention and mobility member of a lift assembly being fastened to an arm. By way of example, the retention and mobility member may have one strength member fastened to an arm and another strength member fastened to a cuff.

Thus, the arm may include a recess in which the retention and mobility member is arranged. Such a hub may be made of composite materials, for example.

The retention and mobility member imparts three degrees of freedom in rotation to the blade, namely a degree of freedom in flapping rotation about a flapping direction, a degree of freedom in pitch rotation about a pitch direction and also a degree of freedom in lead/lag rotation about a lead/lag direction.

In order to control the pitch of a blade, the blade may have a horn 70 for the cuff that is hinged to a pitch lever 71.

Furthermore, the rotor may have inter-blade lead/lag adapters 9, each lead/lag adapter extending from the cuff of one blade to another blade that is adjacent.

In addition, the rotor has at least one abutment mechanism 20 to protect the hub against possible impacts against a lift assembly as a result of a lead/lag movement of the lift assembly. Each abutment mechanism 20 thus limits the lead/lag movement of the lift assembly between two extreme positions.

Figure 2:
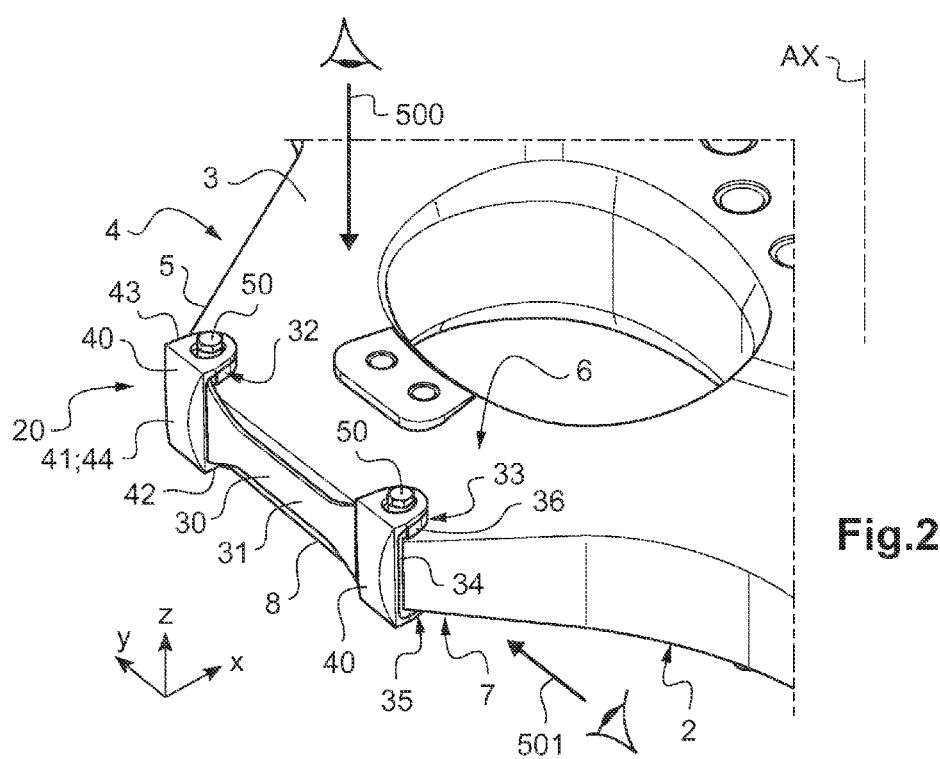
FIG. 2 is a view of an arm of a hub provided with a lead/lag abutment mechanism in a lift assembly.

FIG. 2 shows an arm 4 of a hub. The arm 4 has an end 5 with a top face 6 and a bottom face 7 that are connected together via an edge face 8. The edge face 8 then faces a lift assembly and in particular the surface of the lift assembly that might impact against the hub as a result of a lead/lag movement. For example, the edge face 8 faces a horn 70 carrying a pitch lever.

The end 5 may be of a complex shape comprising two truncated cones, the end 5 forming one cone 500 when seen from above, and forming another cone 501 when seen tangentially.

The abutment mechanism then possesses a spacer strip 30 made of elastomer engaged on the end 5. This spacer strip 30 is provided with a first base 32 and a second base 33 that are connected together by a central section 31.

The central section 31 is substantially plane and placed against the edge face 8. The central section 31 then extends in elevation and transversely along the edge face 8.

In contrast, each base is C-shaped so as to clamp against both the top face 6 and the bottom face 7 as well as the edge face 8.

Thus, each base 32, 33 has a central segment 34 that is substantially plane and pressed against the edge face 8, which central segment is secured to the central section 31.

The central section 31 and the central segment of the first base 32 and the central segment of the second base 33 lie substantially in a common plane in elevation, referred to for convenience as the "touching plane".

Furthermore, each base has two longitudinal projections 35, 36 present at the two ends of the central segment 34 of the base.

Consequently, each base has a bottom longitudinal projection 35 extending from the central segment towards an axis of rotation AX of the hub, being arranged against the bottom face 7 of the hub. Likewise, each base has a top longitudinal projection 36 extending from the central segment towards an axis of rotation AX of the hub, being placed against the top face 6 of the hub.

Each longitudinal projection of a base is substantially perpendicular to the touching plane, and thus to the central segment of the base.

Furthermore, the abutment mechanism is provided with two metal C-shaped clips 40, each covering a respective base 32, 33 of the spacer strip 30.

Thus, each of the two clips is C-shaped so as to be suitable for being engaged respectively on the first base 32 or on the second base 33.

Each clip 40 has a sacrificial surface that is impacted against by a lift assembly as a result of the lift assembly turning in two opposite directions. One clip provides a contact surface in the event of the lift assembly turning clockwise, while the other clip provides a contact surface in the event of the lift assembly turning counter-clockwise.

Furthermore, the abutment mechanism has two fastener pins 50. Each fastener pin passes through a respective clip 40 and the two longitudinal projections 35, 36 of one of the bases 32, 33 and an orifice in the arm 4.

FIG. 3 is an exploded view showing the spacer strip and the two clips of an abutment mechanism.

As shown in FIG. 3, the end 5 of a hub may present different thicknesses at the locations of the two clips.

Thus, by way of example, the edge face 8 may present a first thickness E1 at the location of a first base of the spacer strip, and a second thickness E2 at the location of the second base of the spacer strip. The first thickness E1 and the second thickness E2 are then different.

Under such circumstances, the first base 32 and the second base 33 are preferably of different shapes. For example, the first base may present longitudinal projections that are thicker than the longitudinal projections of the second base.

The first base and the second base may be shaped so as to enable two identical clips 40 to be used.

In order to install the mechanism 20, an operator engages the bases of the spacer strip on the end of the arm so that the central section 31 and the central segments 34 of the bases come into contact with the edge face 8. Each top longitudinal projection 36 then rests on the top face 6 of the arm, and each bottom longitudinal projection 35 is then placed against the bottom face 7 of the arm.

In addition, each longitudinal projection includes a hole in register with an orifice 600 in the arm.

The elastomer structure of the spacer strip makes it possible to accommodate dimensional dispersion in the fabrication of the hub relative to a theoretical definition of the hub.

Consequently, the operator engages each clip on a respective base. For example, each clip is engaged by force in order to avoid the presence of any clearance.

Under such circumstances, a central portion 41 of a clip is arranged against the central segment 34 of a base 32, 33 of said spacer strip 30, the clip 40 having its two branches 42, 43 secured to the central portion 4. The two branches are placed against the longitudinal projections 35, 36 from the base 32 or 33. The face of the central portion of a clip that is arranged against the central segment 34 of a base is preferably plane. Likewise, the face of the central segment of a base arranged against the central portion of a clip is preferably plane.

Furthermore, each branch includes a hole that is arranged in register with an orifice 600 in the arm.

With reference to FIG. 4, the operator then inserts a fastener pin 50 in each orifice 600.

Each fastener pin has two washers and a bolt 51 with a head 52 and a nut 54 for clamping the abutment mechanism against the arm of the hub.

Under such circumstances, the shank 53 of the bolt passes through the two holes 45 and 46 in the branches of a clip and also through the two holes in the longitudinal projections of a base, and through an orifice 600.

A washer 55 with the shank passing therethrough is clamped between the head 52 of the bolt and a longitudinal projection 36 of a base, and another washer 56 is clamped between a nut 54 and the other longitudinal projection 35 of the base.

In addition, each hole in a clip may be an oblong hole.

With reference to FIGS. 4 and 5, each washer 55, 56 is then arranged in an oblong hole 45, 46 in a clip 40. This characteristic allows the clip to move radially, thereby enabling it to move closer to the hub 3 in the event of an impact.

With reference to FIG. 4, at least one longitudinal projection 35, 36 may be tapered so as to compensate for the frustoconical profile of the end of the arm of the hub. Thus, such a longitudinal projection 35, 36 tapers going away from the central section 34 towards an axis of rotation of the hub.

Furthermore, the central portion 41 of a spacer strip may include a bulge 44 facing the lift assembly 10, and in particular facing the surface of the lift assembly that might impact against the hub.

This bulge 44 is in the form of a cylindrical portion 403 of a cylinder 401 having its axis of symmetry 402 substantially parallel to the edge face 8 of an arm. More particularly, this axis of symmetry may coincide with a flapping axis of the lift assembly facing the bulge.

In addition, the spacer strip 30 may be a molded part. In order to avoid shape interference with the angle formed between the faces 6 and 8 of the hub 3, for example, a groove 300 is molded in the junction zone between a longitudinal projection 36 and the central portion 34 of the spacer strip 30.

With reference to FIG. 6, the abutment mechanism 20 may include at least one additional abutment surface 60 that is fastened reversibly to a lift assembly 10.

For example, the mechanism has one additional abutment surface per clip, for the purpose of impacting against the clip.

Such an abutment surface 60 may optionally be made of metal.

Furthermore, the abutment surface 60 may be fastened reversibly to a horn 70 that is hinged to a pitch lever.

In addition, like a clip, the abutment surface 60 may include a protuberance 61 facing a clip 40. This protuberance may be in the shape of a cylindrical portion 62 of a cylinder 63. The axis of symmetry of the cylinder 63 is optionally parallel to the flapping axis of the lift assembly to which the abutment surface is fitted.

With reference to FIG. 7, the additional abutment surface may be in the form of a circular arc 64 having as its center the pitch axis AX1 of the lift assembly to which the additional abutment surface is fitted.

The abutment surface may be flat or it may include a protuberance.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A rotor provided with a hub and a plurality of lift assemblies, each lift assembly having a retention and mobility member connected to an arm of the hub in order to hinge the lift assembly to the hub, the rotor having one abutment mechanism per lift assembly in order to protect the hub in the event of lead/lag movement of the lift assembly, the arm having an end provided with a top face and a bottom face that are connected together by an edge face facing a lift assembly, wherein each abutment mechanism of a lift assembly comprises:
    an elastomer spacer strip having a central section extending transversely from a first base to a second base along the edge face, each base having a central segment secured to the central section, the central segment of each base being arranged against the edge face and extending in elevation from a bottom longitudinal projection arranged against the bottom face to a top longitudinal projection arranged against the top face, so as to present a C-shape;
    two C-shaped metal clips engaged respectively on the first base and on the second base; and
    two fastener pins, each of the pins passing through one of the clips and the two longitudinal projections of one of the respective bases and a respective orifice of the arm extending in elevation from the bottom face to the top face.

2. The rotor according to claim 1, wherein each fastener pin comprises a bolt having a head, a nut, and two washers, one washer arranged between the head and one of the longitudinal projections of one of the bases, and the other washer arranged between the nut and the other longitudinal projection of the same base, each washer being arranged in an oblong hole of a respective one of the clips enabling the respective clip to move towards the hub in the event of an impact.

3. The rotor according to claim 1, wherein the end presents two distinct profiles at the locations of the first base and of the second base, the first base and the second base being different, while both clips are identical.

4. The rotor according to claim 1, wherein at least one longitudinal projection tapers, the longitudinal projection tapering in a longitudinal direction going away from the central segment towards an axis of rotation of the hub.

5. The rotor according to claim 1, wherein at least one of the clips is engaged by force on one of the bases of the spacer strip.

6. The rotor according to claim 1, wherein the hub is made of composite materials.

7. The rotor according to claim 1, wherein at least one of the clips has a central portion arranged against the central segment of one of the bases of the spacer strip, the clip having two branches secured to the central portion that are arranged against the longitudinal projections of the base, the central portion including a bulge facing the lift assembly, the bulge having the shape of a cylindrical portion of a cylinder having its axis of symmetry substantially parallel to the edge face so that an impact against one of the lift assemblies takes place along a generator line of the cylinder regardless of the flapping angle of the lift assembly.

8. The rotor according to claim 7, wherein the axis of symmetry coincides with a flapping axis of the lift assembly.

9. The rotor according to claim 1, wherein the abutment mechanism includes at least one additional abutment surface reversibly fastened on one of the lift assemblies so as to come into abutment against one of the clips starting from a threshold lead/lag angle.

10. The rotor according to claim 9, wherein the additional abutment surface is made of metal.

11. The rotor according to claim 9, wherein the abutment surface includes a protuberance facing one of the clips, the protuberance being in the form of a cylindrical portion of a cylinder.

12. The rotor according to claim 9, wherein the additional abutment surface is in the form of a circular arc centered on a pitch axis of the lift assembly.

13. The rotor according to claim 9, wherein a lift assembly includes a horn hinged to a pitch lever, the horn carrying at least one abutment surface.

14. An aircraft having a rotor according to claim 1.

15. A rotor provided with a hub, a plurality of lift assemblies, and one abutment mechanism per lift assembly, each lift assembly having a retention and mobility member connected to an arm of the hub to connect the lift assembly to the hub, with the arm having an end provided with a top face, a bottom face and an edge face connecting the top and bottom faces, with the edge face facing the lift assembly, each abutment mechanism comprising:
    an elastomer spacer strip having a central section extending transversely from a first base to a second base along the edge face, each base having a central segment secured to the central section, the central segment being disposed against the edge face and extending in elevation from a bottom longitudinal projection arranged against the bottom face to a top longitudinal projection arranged against the top face;
    a first metal clip engaged on the first base;
    a second metal clip engaged on the second base;
    a first fastener pin passing through the first metal clip and the two longitudinal projections of the first base and a first orifice of the arm extending in elevation from the bottom face to the top face; and
    a second fastener pin passing through the second metal clip and the two longitudinal projections of the second base and a second orifice of the arm extending in elevation from the bottom face to the top face.

16. The rotor according to claim 15, wherein each of the fastener pins comprise a bolt having a head and a nut and a first washer and a second washer, the first washer being disposed between the head of the fastener pin and the top longitudinal projection of one of the bases, and the second washer being disposed being between the nut of the fastener pin and the bottom longitudinal projection of the same base, each washer being arranged in an oblong hole of a respective one of the first and second clips enabling the respective clip to move towards the hub in the event of an impact.

17. The rotor according to claim 15, wherein the end presents two distinct profiles at the locations of the first base and of the second base, the first base and the second base being different, while both of the clips are identical.

18. The rotor according to claim 15, wherein at least one longitudinal projection tapers, the longitudinal projection tapering in a longitudinal direction going away from the central segment towards an axis of rotation of the hub.

19. The rotor according to claim 15, wherein at least one of the clips is engaged by force on one of the bases of the spacer strip.

20. The rotor according to claim 15, wherein at least one of the clips has a central portion disposed against the central segment of one of the bases of the spacer strip, the at least one of the clips having two branches secured to the central portion that are arranged against the longitudinal projections of the one of the bases, the central portion including a bulge facing the lift assembly, the bulge having the shape of a cylindrical portion of a cylinder having its axis of symmetry substantially parallel to the edge face so that an impact against the lift assembly takes place along a generator line of the cylinder regardless of the flapping angle of the lift assembly.

* * * * *